United States Patent
Sato

(10) Patent No.: US 11,283,940 B2
(45) Date of Patent: Mar. 22, 2022

(54) NON-TRANSITORY STORAGE MEDIUM STORING PROGRAM SET READABLE BY COMPUTER OF INFORMATION PROCESSING APPARATUS, METHOD FOR OBTAINING READ RESULT, AND INFORMATION PROCESSING APPARATUS

(71) Applicant: Brother Kogyo Kabushiki Kaisha, Nagoya (JP)

(72) Inventor: Ryoichi Sato, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/194,496

(22) Filed: Mar. 8, 2021

(65) Prior Publication Data

US 2021/0289076 A1    Sep. 16, 2021

(30) Foreign Application Priority Data

Mar. 10, 2020    (JP) .............................. JP2020-041093

(51) Int. Cl.
| | |
|---|---|
| *G06F 3/12* | (2006.01) |
| *H04N 1/00* | (2006.01) |
| *H04N 1/32* | (2006.01) |
| *H04N 1/333* | (2006.01) |

(52) U.S. Cl.
CPC ....... *H04N 1/0022* (2013.01); *H04N 1/00811* (2013.01); *H04N 1/00949* (2013.01); *H04N 1/32523* (2013.01); *H04N 1/33346* (2013.01)

(58) Field of Classification Search
CPC ............. H04N 1/0022; H04N 1/00811; H04N 1/00949; H04N 1/32523; H04N 1/33346
See application file for complete search history.

(56) References Cited

U.S. PATENT DOCUMENTS

| | | | |
|---|---|---|---|
| 2006/0104238 A1* | 5/2006 | Hibino | H04W 8/20 370/328 |
| 2009/0064198 A1 | 3/2009 | Kobayashi et al. | |
| 2014/0043659 A1* | 2/2014 | Kawakami | G06K 9/00979 358/470 |
| 2016/0165071 A1* | 6/2016 | Inoue | H04N 1/3877 358/474 |
| 2019/0303068 A1 | 10/2019 | Yamada | |

FOREIGN PATENT DOCUMENTS

| | | |
|---|---|---|
| JP | 2009-076068 A | 4/2009 |
| JP | 2016-111560 A | 6/2016 |
| JP | 2019-175313 A | 10/2019 |

* cited by examiner

*Primary Examiner* — Moustapha Diaby
(74) *Attorney, Agent, or Firm* — Burr & Brown, PLLC

(57) ABSTRACT

A non-transitory storage medium stores a program set readable by a computer of a first information processing apparatus. The program set including a first program and a second program. The first program causes the first information processing apparatus to start the second program, and register the started second program, as a virtual scanner, in an operating system of the first information processing apparatus. The second program causes the first information processing apparatus to transmit a scan command of the first protocol to the external scanner, and receive a read result from the external scanner by the first protocol through the communication interface. The external scanner reads a document in response to receipt of the scan command transmitted from the information processing apparatus.

12 Claims, 7 Drawing Sheets

NON-TRANSITORY STORAGE MEDIUM STORING PROGRAM SET READABLE BY COMPUTER OF INFORMATION PROCESSING APPARATUS, METHOD FOR OBTAINING READ RESULT, AND INFORMATION PROCESSING APPARATUS

BACKGROUND

The present application claims priority from Japanese Patent Application No. 2020-041093, which was filed on Mar. 10, 2020, the disclosure of which is herein incorporated by reference in its entirety.

The following disclosure relates to a non-transitory storage medium storing a program set readable by a computer of an information processing apparatus which controls a scanner, a method for obtaining a read result, and the information processing apparatus.

In an information processing apparatus capable of communicating with a device such as a scanner, a technique of executing data communication with the scanner by a given general-purpose protocol is known. For example, there is disclosed a configuration in which data communication is executed between the information processing apparatus and the scanner by a protocol called IPP (Internet Printing Protocol). IPP is a general-purpose protocol and is not applicable to a specific function that is a setting of a document opening direction; therefore, there is also disclosed a configuration in which the above setting is executed on the scanner's side to thereby realize the specific function.

SUMMARY

In order to execute communication between the information processing apparatus and the scanner with a given general-purpose communication protocol, it is necessary that the scanner as a communication destination conforms to the general-purpose communication protocol. Accordingly, when a scan system incorporated in the information processing apparatus executes data communication by using the given general-purpose communication protocol, the information processing apparatus cannot use the scanner that does not conform to the given general-purpose communication protocol. For example, in a case where the information processing apparatus executes data communication by using IPP, the information processing apparatus cannot use the scanner not conforming to IPP.

Even when the scanner conforms to the given general-purpose communication protocol, in a case where the information processing apparatus uses a setting that is not supported by the IPP on the scanner's side, it is necessary to switch the setting in the scanner every time, or a user interface of the scanner is difficult to use, which is troublesome for a user. Also in a case where scanning is executed by using a general-purpose driverless scanning function such as AirPrint (registered trademark), the similar problems may occur as the general-purpose communication protocol is used.

An aspect of the disclosure relates to a technique of increasing usability of the scanner in a case where the scanner is used from the information processing apparatus.

In one aspect of the disclosure, a non-transitory storage medium stores a program set readable by a computer of a first information processing apparatus. The program set includes a first program and a second program. In a state in which (i) an external scanner conforming to a first protocol is communicable through a communication interface of the first information processing apparatus and (ii) the second program corresponding to the external scanner is not started, the first program, when executed by the computer, causes the first information processing apparatus to start the second program, and register the started second program, as a virtual scanner, in an operating system of the first information processing apparatus. When the operating system receives, by a second protocol different from the first protocol, a scan job in which the second program registered as the virtual scanner in the operating system is designated as an output destination, the second program, when executed by the computer, causes the first information processing apparatus to transmit a scan command of the first protocol to the external scanner through the communication interface based on the received scan job, the external scanner being conformable to the first protocol, and receive a read result from the external scanner by the first protocol through the communication interface, the external scanner reading a document in response to receipt of the scan command transmitted from the information processing apparatus.

In another aspect of the disclosure, An information processing apparatus includes a communication interface, and a computer. The computer is configured to: in a case where (i) an external scanner conforming to a first protocol is communicable with the information processing apparatus through the communication interface and (ii) a scan server program conforming to the external scanner is not started in the information processing apparatus, start the scan server program, register the started scan server program in an operating system of the information processing apparatus as a virtual scanner; when the operating system receives, by a second protocol different from the first protocol, a scan job in which the scan server program registered as the virtual scanner in the operating system is designated as an output destination in a state in which the scan server program is started, cause the scan server program to obtain the scan job; transmit a scan command of the first protocol to the external scanner through the communication interface based on the obtained scan job, the external scanner being conformable to the first protocol; and receive a read result obtained from the external scanner h the first protocol through the communication interface, the external scanner reading a document in response to receipt of the scan command transmitted from the information processing apparatus.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, a first embodiment embodying a scan system will be explained in detail with reference to the attached drawings. The embodiment discloses a scan system including a plurality of personal computers (hereinafter referred to as "PCs") and a scanner connecting to these PCs.

Figure 1:
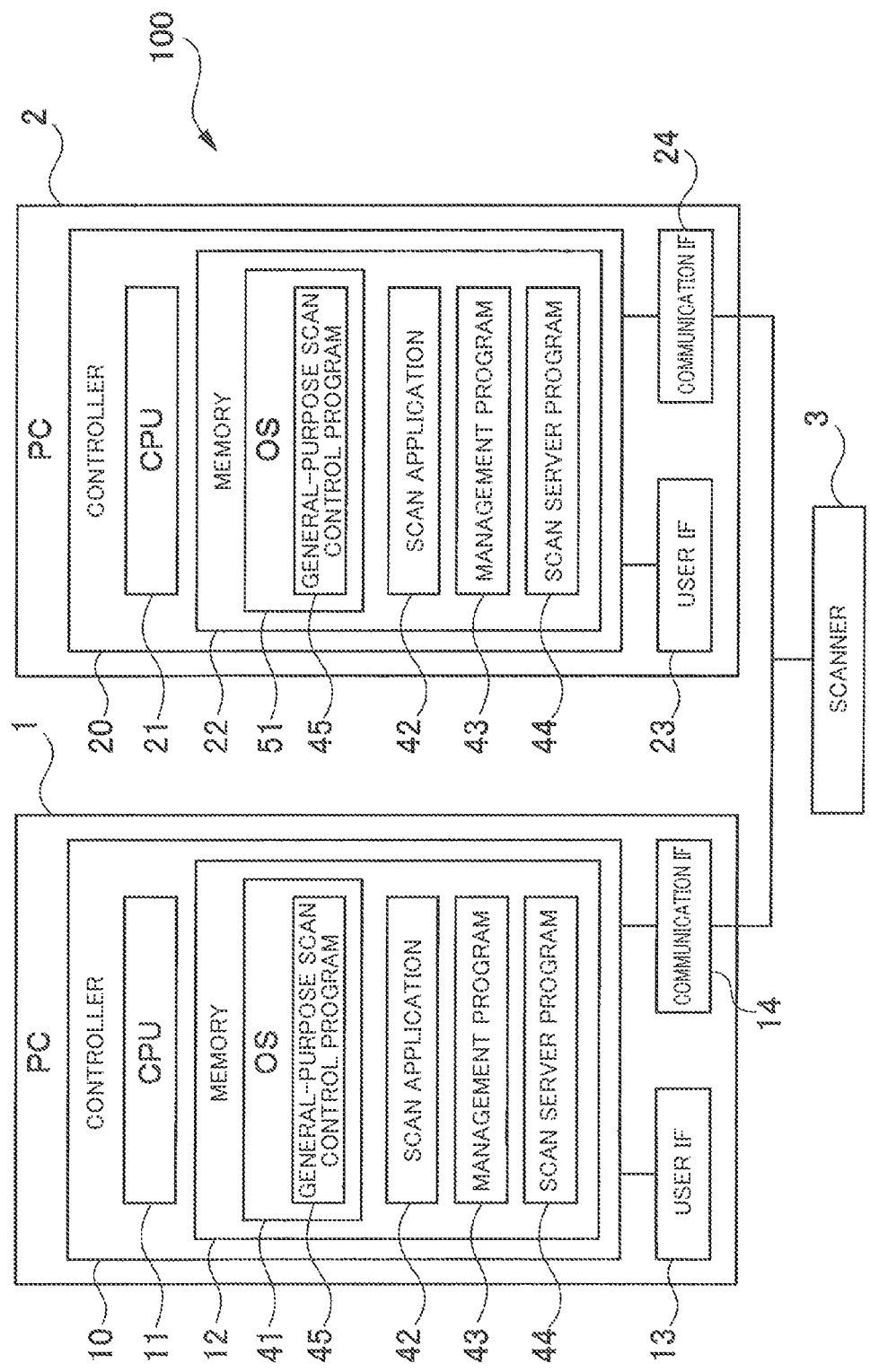
FIG. 1 is schematic configuration diagram of a scan system according to an embodiment.

A scan system 100 according the embodiment is a system including a PC 1, a PC 2, and a scanner 3 as an example of an external scanner as illustrated in FIG. 1, the PC 1, the PC 2 and the scanner 3 are connected to a common network to one another. The PC 1 and the PC 2 are apparatuses that execute transmission of a scan executing instruction to the scanner 3, reception of image data from the scanner 3, editing of the received image data, and so on. The PC 1 and the PC 2 are both examples of an information processing apparatus. The PC 1 is an example of a first information processing apparatus, the PC 2 is an example of a second information processing apparatus. The PC 2 is the apparatus having the same configuration and function as those of the PC 1, and explanation will be made by taking the PC 1 as a representative in a range not necessary to discriminate in the following description. For example, a smartphone or a tablet computer may be used instead of the PC 1 or the PC 2.

The PC 1 according to the embodiment includes a controller 10 having a CPU 11 and a memory 12 as illustrated in FIG. 1. The PC 1 also includes a user interface thereinafter referred to as "user IF") 13 and a communication interface thereinafter referred to as "communication IF") 14, and the user IP 13 and the communication IF 14 are electrically connected to the controller 10. The controller 10 in FIG. 1 is a general term used when hardware and software used for controlling the PC 1 are collectively called, which does not always represent single hardware existing in the PC 1.

The CPU 11 executes various processing in accordance with programs read out from the memory 12 or based on operations of a user. The CPU 11 is an example of a computer. The memory 12 is a storage area for storing various programs such as a startup program for starting the PC 1 and various application programs (hereinafter referred to as "applications") for using the scanner, various data such as image data and document data and various setting information. The memory 12 is also used as a work area when various processing is executed.

The user IF 13 is, for example, a touch panel, including hardware configured to display a screen for notifying the user of information, and hardware configured to receive input operations by the user. The user IF 13 may be a combination of a display having a display function, and a keyboard, a mouse, a trackball, or the like having an input receiving function.

The communication IF 14 includes hardware for communicating with external devices such as the PC 2 and the scanner 3. A communication standard of the communication IF 14 includes, for example, Ethernet (registered trademark), Wi-Fi (registered trademark), and the like, and the communication standard includes standards for wired and wireless communications. The communication IF 14 may also include a plurality of configurations conforming to a plurality of communication standards. In the scan system 100 according to the embodiment, a communication system between the PC 1 and the PC 2, a communication system between the PC 1 and the scanner 3, and a communication system between the PC 2 and the scanner 3 may differ from one another, respectively.

The memory 12 of the PC 1 stores various data and various programs including an OS 41, a scan application 42, a management program 43, and a scan server program 44 as illustrated in FIG. 1. A general-purpose scan control program 45 is incorporated in the OS 41. The OS 41 is, for example, iOS (registered trademark), Android (registered trademark), Microsoft Windows (registered trademark), mac OS (registered trademark), or Linux (registered trademark). The management program 43 is an example of a first program, and the scan server program 44 is an example of a second program. A pair of the management program 43 and the scan sever program 44 is an example of a program set.

The scan application 42 receives user's instructions such as a designation of a device allowed to execute scanning, a designation of a saving area of a read result, an instruction for execution of scanning, and various scan settings. The scan application 42 may further receive instruction for display or editing of an image as the read result received from the scanner.

The general-purpose scan control program 45 is a program configured to control the operation of the scanner based on a prescribed standard. The general-purpose scan control program 45 is a program using a scan control function of the OS 41, and the general-purpose scan control program 45 is a standard program provided by the OS 41. The general-purpose scan control program 45 is a general-purpose program conforming to scanners in a plurality of models that support the prescribed standard. Accordingly, scanners made by any manufacturer can execute scanning based on the standard as long as the scanners have the function corresponding to the general-purpose scan control program 45. As scan systems using the general-purpose scan control program 45, for example, Airprint, Mopria (registered trademark) can be cited.

As the general-purpose scan control program 45 is a general-purpose program conforming to the plurality of models, acceptable scan settings are limited to general settings. Accordingly, the general-purpose scan control program 45 does not always accept all scan settings executable in a designated scanner.

The OS 41 according to the embodiment belongs to a version in which the control of the scanner is executed by using the general-purpose scan control program 45 and, for example, installation of individual control programs such as a scanner driver conforming to individual models is not received. The scan application 42 according to the embodiment supports the general-purpose scan control program 45 and is capable of passing a scan job to the OS 41 by a prescribed general-purpose protocol supporting the general-purpose scan control program 45. The OS 41 generates a scan command by using the general-purpose scan control program 45 based on the passed scan job and transmits the generated scan command to the designated scanner by the general-purpose protocol. The general-purpose protocol is, for example, IPP, which is an example of a second protocol.

The OS 41 also has a function of determining whether the scanner connected to the PC 1 conforms to the general-purpose scan control program 45 or not and registering information of the conformable scanner in the memory 12. The scan application 42 receives a selection of a device allowed to execute scanning from scanners registered in the memory 12. The scanner 3 of the scan system 100 according to the embodiment does not support a standard used by the general-purpose scan control program 45 and does not conform to the general-purpose protocol, as an example. That is, the scanner 3 is incapable of receiving the scan command generated by the OS 41, or incapable of executing processing correctly if the scanner 3 receives the command. Moreover, the scanner 3 of the scan system stem 100 according to the embodiment supports the standard used by the general-purpose scan control program 45 and conforms to the general-purpose protocol; however, the scanner 3 has a function that is not supported in the standard used by the general-purpose scan control program 45, as an example.

The management program 43 is a program configured to manage the operation of the scanner 3 and the operation of the scan server program 44. Specifically, the management program 43 is a program that starts up the scan server program 44 conforming to the scanner 3 and registers the scan server configured by the scan server program 44 in the OS 41 as a virtual scanner. When the scan server is registered in the OS 41 as the virtual scanner, the virtual scanner, namely, the scan server program 44 can be selected as the scanner by the scan application 42 or the like.

The scan server program 44 is a program configured to receive the scan command generated by the OS 41 instead of the scanner. The scan server program 44 is a program conforming to the model of the scanner 3, and is capable of conforming to both a dedicated protocol (a specialized protocol) as a protocol applicable to the scanner 3 and the general-purpose protocol. The dedicated protocol is an example of a first protocol. In the scan system 100 according to the embodiment, when the virtual scanner registered in the OS 41 is selected, the OS 41 passes the generated scan command to the scan server program 44.

The scanner 3 of the scan system 100 according to the embodiment is a device having a communication function with the PC 1 or the PC 2, and an image reading function of reading a document image and obtaining image data. The scanner 3 is not limited to the device with a single function of scanning, but may be, for example, a multifunction apparatus, a copy machine, or a FAX machine.

Next, procedures of scan processing executed by the PC 1 in the scan system 100 according to the embodiment will be explained with reference to sequence diagrams of FIG. 2 to FIG. 5. Note that processing in the following explanation and respective processing steps of the flowchart basically indicate processing of the CPU 11 that follows instructions described in programs such as the management program 43 and the scan server program 44. The processing by the CPU 11 also includes hardware control using an IF (also called API) for exchanging data with other modules in the OS 41 of the PC 1. In the specification, the description of the OS 41 may be omitted to explain the operation of respective programs.

First, a procedure of registering the virtual scanner executed before execution of scanning will be explained with reference to the sequence diagram of FIG. 2. First, the management program 43 is started (S101). The management program 43 is automatically started at the time of starting the PC 1, for example. The management program 43 may be started based on an instruction by the user.

When the program is started, the management program 43 first searches for the scan server that is running in another PC included in the scan system 100 in which the PC 1 is included (S102). In the embodiment, the management program 43 inquires of the PC 2 in the scan system 100 whether the scan server program 44 of the PC 2 is running or not. In the case where a plurality of PCs or the like are connected to the same System, the management program 43 of the PC 1 makes inquiries to other all PCs or the like.

Then, the management program 43 receives reply information from the PC 2 (S103). When the scan server program 44 of the PC 1 or the PC 2 receives inquiries from other devices during execution of the scan server program 44, the scan server program 44 transmits information indicating that the program is running. When it is determined that information indicating that the program is running has been received (YES), the management program 43 passes information indicating the scan server program 44 of the PC 2 to the OS 41 (S104), and requests the OS 41 to register the scan server program 44 as the scanner.

The management program 43 further transmits a list registration request for requesting the PC 2 to add information of the apparatus itself (i.e., the PC 1) to a saving destination list of the scan server program 44 of the PC 2 and identification information of the apparatus itself to the PC 2 (S105). The saving destination list is a list in which an apparatus that receives and stores a read result obtained by reading a document image by the scanner 3 through the scan server program 44 is registered.

The OS 41 registers the scan server program 44 that is running in the PC 2 as the scanner based on the information received at S104 (S106). Accordingly, when an instruction for selecting the scanner is received by the scan application 42 or the like, the OS 41 passes information of the scan server program 44 running in the PC 2 to the scan application 42 or the like as one of choices of the scanner. As the scan server program 44 running in the PC 2 can be used, it is not necessary to start a plurality of scan server programs 44, including the scan server program 44 of the PC 1, in the entire scan system 100 that shares the scanner 3 among the plurality of PCs, which reduces waste in the entire system.

On the other hand, when it is determined that information indicating that the scan server program 44 is running has not been received (NO), the management program 43 instructs the scan server program 44 included in the apparatus itself, that is the scan server program 44 of the PC 1, to start (S107). The management program 43 determines that the information indicating that the program is running has not been received also in a case where reply information has not been received within a prescribed period of time such as in a case where the PC 2 has not been started.

When the scan server program 44 is started, the scan server program 44 executes initial setting based on information possessed by the program itself such as model information and ability information of the scanner (S108). The scan server program 44 obtains information of the scanner 3 at the time of installation or execution of last time and stores the information in a storage area managed by the scan server program 44. The scan server program 44 transmits setting information of initial setting to the management program 43 when completing the startup (S109). The management program 43 passes information of the scan server program 44 to the OS 41 based on the received information (S110), and the management program 43 requests the OS 41 to register the scan server program 44 as the scanner.

The management program 43 further passes a list registration request for requesting the started scan server program 44 of the PC to create the saving destination list and register information of the apparatus itself, i.e., the PC 1 (S111). The scan server program 44 of the PC 1 registers apparatus identification information of the apparatus itself, i.e., the PC 1, in the saving destination list based on the received request (S112). If the saving destination list managed by the scan server program 44 of the PC 1 already exists, the scan server program 44 registers requested information in the saving destination list. The OS 41 registers the started scan server program 44 of the PC 1 as the scanner based on information received from the management program 43 at S110 (S113). It is preferable that the scanner is registered in the OS 41 with a name indicating the scanner 3 at S106 or S113.

The scan server program 44 that is running in the PC 1 may receive the search for the scan server or the list registration request from other apparatuses connected to the scan system 100 such as the PC 2. When receiving the search for the scan server, the scan server program 44 of the PC 1 transmits information indicating that the scan server program of the PC 1 is running to the PC 2 (S114). When receiving the list registering request, the scan server program 44 of the PC 1 registers apparatus identification information of the apparatus which has transmitted the list registration request in the saving destination list possessed by the scan server program 44 of the PC 1 (S115).

According to the above, preparation for executing scanning by the user of the PC 1 by using the scanner 3 is completed. When the scan server program 44 is running in the PC 2 and information of the scan server program 44 has been registered in the OS 41 as the scanner, information of the scanner is lost when the PC 2 is shut down. After the management program 43 of the PC 1 registers, for example, the scan server program 44 of the PC 2 in the OS 41 as the virtual scanner, the management program 43 executes communication with the scan server program 44 of the PC 2 periodically. When the scan server program 44 that is running is not found, the management program 43 searches for the scan server program 44 that is running in another PC, and the scan server program 44 of the PC 1 may be started if the scan server program 44 that is running in another PC is not found.

The saving destination list may be permanently stored in a storage area managed by the scan server program 44 instead of creating the list at the time of starting the scan server program 44. For example, a saving destination list in which information of the PCs and the like (the PC 1 and the PC 2 in the embodiment) included in the scan system 100 has been registered in advance may be created.

Figure 2:
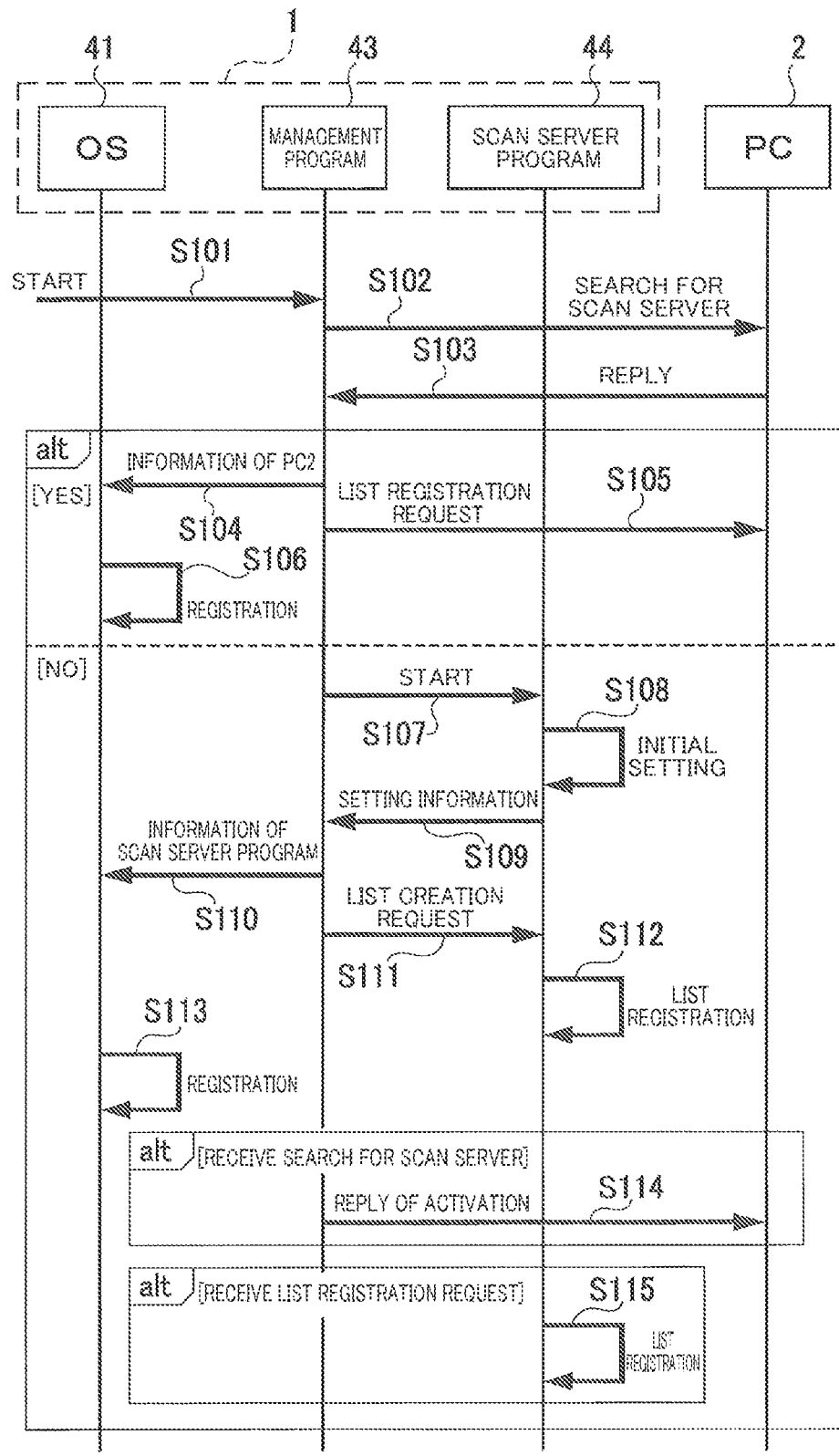
FIG. 2 is a sequence diagram illustrating procedures of startup and registration of a scan server.

Next, a procedure of using the scanner 3 in the scan application 42 of the PC 1 in a state in which the above procedure of FIG. 2 is completed and the scan server program 44 is running in the PC 1 or the PC 2 will be explained. The scan application 42 displays information of the scanners registered in the OS 41 when receiving an instruction for selecting the scanner, and receives a selection by the user. As the scan server program 44 that is running is registered in the OS 41 at S106 or S113 of FIG. 2, the running scan server program 44 is displayed as one of choices.

An execution procedure of the scanning by receiving the instruction for executing scanning by the scan application 42 of the PC 1 in a state in which the scan server program 44 is selected as an apparatus allowed to execute scanning, namely, a procedure of pull scan will be explained with reference to a sequence diagram of FIG. 3.

When the scan application 42 receives the instruction for executing scanning (S201), the scan application 42 passes the scan, ob to the OS 41 (S202). The OS 41 generates a scan command of the general-purpose protocol using the general-purpose scan control program 45 based on the received scan job, and passes the generated scan command to the scan server program 44 as the selected apparatus (S203). Accordingly, the scan server program 44 obtains the scan command.

The scan server program 44 transmits an instruction for checking the status to the scanner 3 (S204). The scan server program 44 conforms to the dedicated protocol and is capable of communicating with the scanner 3 by the dedicated protocol. The scanner 3 replies information indicating the status of the scanner 3 to the scan server program 44 of the apparatus which has transmitted the instruction for checking the status (S205). The status of the scanner includes, for example, available and unavailable, and the scanner 3 may reply further detailed information.

When the scan server program 44 determines that reply information indicating availability has been received ("OK"), the scan server program 44 converts the scan command of the general-purpose protocol received at S203 into a scan command of a dedicated protocol (S206). The scan server program 44 transmits the converted scan command to the scanner 3 by the dedicated protocol (S207).

The scanner 3 executes scanning based on the scan command of the dedicated protocol received at S207 (S208). At S208, the scanner 3 executes scanning by receiving an instruction for starting scanning by the user who has set a document. Then, the scanner 3 transmits the read result obtained by reading the document to the scan server program 44 of the apparatus which has transmitted the scan command (S209).

The scan server program 44 receives the read result transmitted from the scanner 3 at S209. The communication at S209 is also communication by the dedicated protocol. The scan server program 44 executes image correction to the received read results (S210). The scan server program 44 executes, for example, character recognition processing and moire removing processing as image correction. The scan server program 44 may receive a user's instruction relating to whether image correction is executed or not. When the image correction is executed, more preferable image data can be obtained.

The scan server program 44 passes the corrected image data to the OS 41 of the apparatus which has transmitted the scan command at S203 (S211). The OS 41 passes the received image data to the scan application 42 as the program which has received the scan job at S202 (S212). Accordingly, the scan application 42 receives the read result by the scanner 3.

On the other hand, when the reply received at S205 is unavailable, or when the reply has not been received from the scanner 3 after a prescribed period of time has passed ("NG"), the scan server program 44 transmits an error notification indicating that the scanner 3 is in an error state to the OS 41 (S213). When the OS 41 receives the error notification from the scan server program 44, the OS 41 causes the user IF 13 to display a message indicating the error (S214).

According to the above, it is possible to obtain the read result from the scan application 42 by using the scanner 3 even in a case of the scanner 3 not conforming to the general-purpose protocol by selecting the scan server program 44 instead of the scanner 3. It is not always necessary to execute the image correction of the read result or the error notification in the error state.

Figure 4:
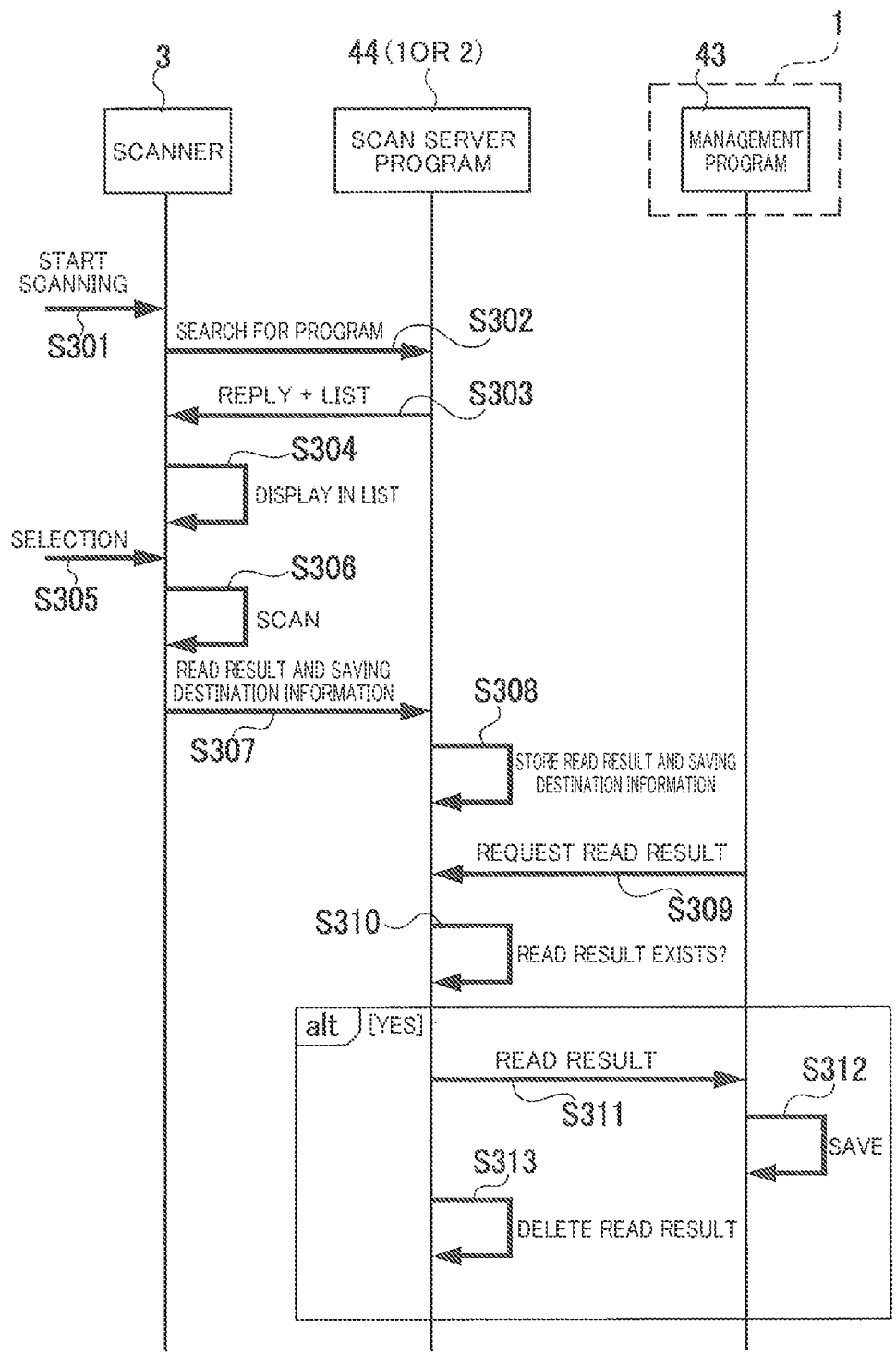
FIG. 4 is a sequence diagram illustrating a procedure of push scan.
Figure 5:
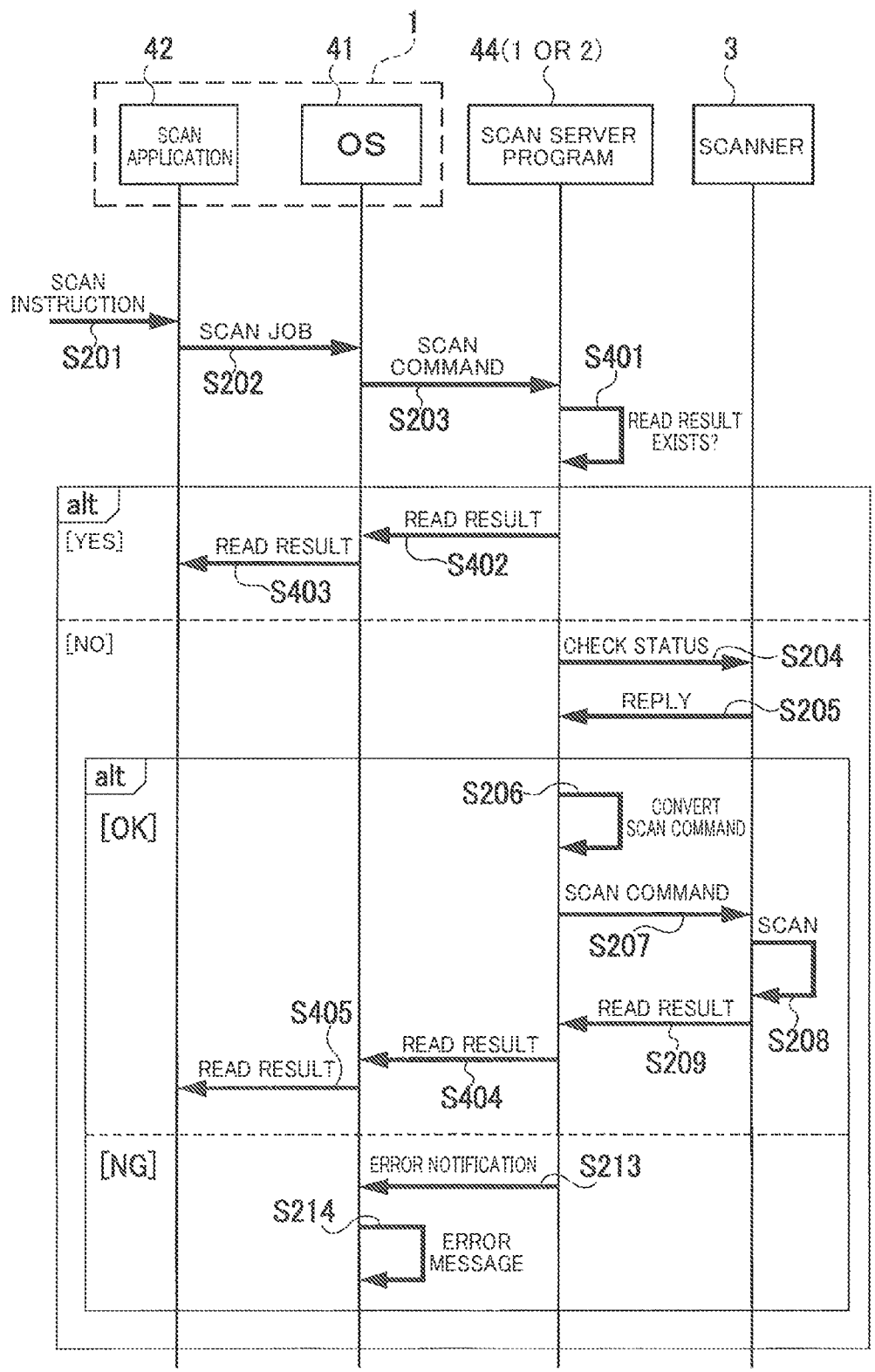
FIG. 5 is a sequence diagram illustrating a procedure of a program capable of executing both pull scan and push scan.

Next, a procedure of allowing the scanner 3 to execute scanning will be explained further with reference to a sequence diagram of FIG. 4. FIG. 4 is the sequence diagram indicating an execution procedure of scanning at the time of receiving the instruction for executing scanning by the scanner 3, namely, so-called push scan. The general-purpose scan control program 45 does not support a push scan function, and the running scan server program 44 is used.

When the scanner 3 receives the instruction for starting scanning on an operation panel of the scanner 3 in a state in which the scan command has not been received (S301), the scanner 3 transmits a search request for the PC properly communicable with the scanner 3 that is running through the network of the scan system 100 (S302). That is, the scanner 3 searches for the PC capable of executing communication by the dedicated protocol. The scan server program 44 transmits apparatus identification information of the apparatus itself when receiving the search request from the scanner 3 (S303).

The scan server program 44 passes, to the scanner 3, the saving destination list saved in the storage area managed by the scan server program 44 at S303. The saving destination list is the list, for example, created at S111 of FIG. 2 as the list of apparatuses which can communicate with the scanner 3 by using the scan server program 44.

The scanner 3 displays a list of saving destination information indicating saving destinations of the read result on the operation panel of the device itself based on the received saving destination list (S304), and the scanner receives the selection by the user (S305). The saving destination information may be the saving destination list itself, or may be information obtained by converting the saving destination list into information easily understandable by the user. When the scanner 3 further receives the instruction for starting scanning by the user, the scanner 3 scans and reads the document image (S306), then, the scanner 3 transmits the read result and the saving destination information received at S305 to the scan server program 44 (S307).

The scan server program 44 associates the received read result with the saving destination information and stores it into a memory area managed by the scan server program 44 (S308). By receiving the saving destination information indicating saving destinations registered in the scanner 3 together with the read result, the scan server program 44 can store read results in memory areas of the respective PCs such as PC 1 s according to the saving destination information. The memory area is provided in the memory (12 or 22, see FIG. 1) of the apparatus in which the scan server program 44 is running.

The management program 43 passes an output request for requesting the read result in which the apparatus itself is designated as the saving destination to the scan server program 44 periodically or when receiving the instruction by the user (S309). When the management program 43 and the scan server program 44 are running at the same PC, the management program 43 inputs the output request to the scan server program 44. When the scan server program 44 is running at a PC different from a PC in which the management program 43 is running, the management program 43 adds identification information of the PC in which the management program 43 is running to the output request and transmits the output request to the PC in which the scan server program 44 is running.

The scan server program 44 that has received the output request determines whether the read result addressed to the management program 43 which has transmitted the output request exists in the memory area managed by the management program 43 or not (S310). That is, the scan server program 44 determines existence of the read result in which the identification information added to the received output request is identical with the saving destination information added to the read result.

When it is determined that the read result exists ("YES"), the scan serer program 44 passes the read result to the management program 43 which has requested the read result (S311). When a plurality of read results exist, the scan server program 44 passes all read results. The read result pushed from the scanner 3 is stored by the scan server program 44 once and is saved to a true saving destination later; therefore, it is not necessary that the true saving destination is stalled when the scan server program 44 receives the read result. When it is determined that the read result in which identification information added to the output request is identical with the saving destination information added to the read result does not exist, the scan server program 44 may return information indicating that the result does not exist.

The management program 43 saves the received read result as a file (S312). The management program 43 may notify that the file has been created. The management program 43 may also save the read result in a predetermined folder such as a folder managed by the management program 43, or may determine a folder as a saving destination based on a user's instruction. Accordingly, image data of the document image instructed to be read by the scanner 3 is properly saved by the management program 43; therefore, so-called push scan is realized. When the management program 43 saves the read result as a file, the user can easily find the read result push-transmitted from the scanner 3 in a folder where the file is saved and check the read result.

The scan server program 44 deletes the read result which has been passed from the memory area managed by the scan server program 44 (S313). Accordingly, a data volume of the memory area can be saved. The scan server program 44 may delete the read result after confirming that the saving in the management program 43 is completed, may delete the read result when the read result remains in the memory area after a certain period of time passes, or may delete the read result based on a user's instruction.

The procedure of the push scan in which the management program 43 receives the read result has been explained in FIG. 4; however, the read result of the push scan can be also received by the scan application 42. The procedure will be explained with reference to a sequence diagram of FIG. 5. The same reference signs are given to the same procedures as those of FIG. 3 and FIG. 4, and explanation thereof is omitted in the following description.

Figure 3:
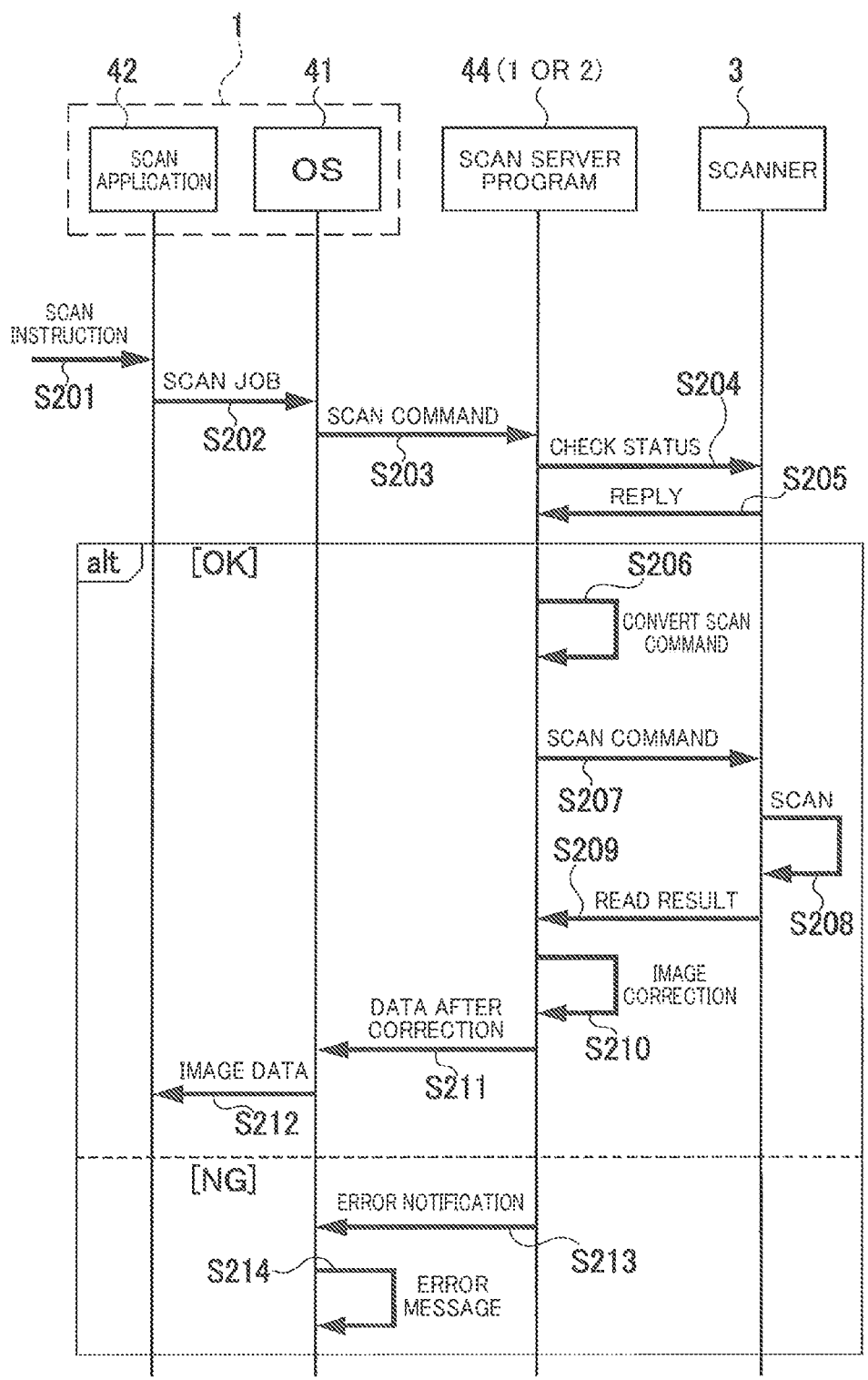
FIG. 3 is a sequence diagram illustrating a procedure of pull scan.

In this procedure, the instruction for executing scanning is received by the scan application 42 of the PC 1 in the state in which the scan server program 44 is selected instead of the scanner 3 in the same manner as the procedure of the pull scan illustrated in FIG. 3 (S201). The scan application 42 passes a scan job to the OS 41 by the general-purpose protocol (S202). The OS 41 generates a scan command and passes the scan command to the scan server program 44 (S203).

The scan server program 44 determines whether the read result to which identification information of the PC which has transmitted the received scan command is added exists in the memory area managed by the scan server program 44 or not (S401). S401 is the same processing as S310 of FIG. 4; however, the scan server program 44 makes a determination based on information of the PC of a transmission source of the scan command instead of making a determination based on identification information added to the output request. When the OS 41 and the scan server program 44 are running in the same PC, the scan server program 44 determines existence of the read result to which identification information of the PC is added.

It is necessary that the user who executes the push scan executes reading of the document by the scanner 3 before executing the instruction for scanning at S201. That is, S301 to S308 in FIG. 4 have been executed in the case of the push scan. In this case, the scan server program 44 does not delete the read result at S313 and stores the result in the memory area managed by the scan server program 44.

When the scan server program 44 determines that the corresponding read result exists ("YES"), the scan server program 44 passes the read result to the OS 41 which has outputted the scan command (S402). In a case where the scan server program 44 is running in a PC different from the PC in which the scan application 42 is running, the scan server program 44 transmits the read result to the PC which has transmitted the scan command.

The OS 41 which has received the read result passes the received read result to the scan application 42 (S403). That is, the read result can be obtained by using the scan application 42 by causing the scanner 3 to execute scanning in advance.

When it is determined that the corresponding read result does not exist ("NO"), the scan server program 44 executes the same procedure as the procedure of pull scan illustrated in FIG. 3. That is, the scan server program 44 transmits a status check to the scanner 3 (S204) and receives a reply from the scanner 3 (S205). When the reply is OK ("OK"), the scan server program 44 converts the received scan command (S206) and transmits the converted scan command to the scanner 3 (S207).

The scanner 3 executes scanning based on the received scan command (S208) and transmits the read result to the scan server program 44 (S209). The scan server program 44 passes the received read result to the OS 41 which has outputted the scan command (S404). S404 is the same processing as S402. The OS 41 which has received the read result passes the received read result to the scan application 42 (S405). S405 is the same processing as S403. The scan server program 44 may execute image correction also before S402 or S404.

That is, the scan server program 44, when receiving the scan command, transmits the read result if the read result of push scan is stored, and transmits the scan command to the scanner 3 if the read result is not stored. The user using the scan application 42 only has to execute the operation of instructing reading in either case; therefore, the system has good operability. The saving destination of the read result can be determined based on identification information of the PC and saving destination information even when the scan server program 44 is running in the PC different from the PC on which the scan application 42 is running; therefore, the scan server program 44 can pass the read result to the proper saving destination.

On the other hand, when the reply of OK is not obtained from the scanner 3 ("NG"), the scan server program 44 transmits the error notification to the OS 41 (S213), and the OS 41 causes the user IF 13 to display the message for notifying the error (S214).

According to the above, the scanner 3 not conforming to the general-purpose protocol can execute scanning based on the scan command by the general-purpose scan control program 45 to obtain the read result by the scan application 42 of the PC 1 or the PC 2. Also when using the general-purpose scan control program 45 that does not support the push scan, processing similar to the push scan can be realized in a pseudo manner.

The scan server program 44 may be constantly executed during activation of the PC 1 or the PC 2, or may be ended, for example, based on an end instruction by the user. The scan server program 44 may notify the management program 43 that registers the scan server program 44 of the end of the scan server program 44 before ending the scan server program 44.

As described above in detail, the management program 43 starts the scan server program 44 conforming the scanner 3 and registers the started scan server program 44 in the OS 41 when the scanner 3 supporting the dedicated protocol is included in the system according to the scan system in the embodiment. Accordingly, the scan server program 44 can be selected in the OS 41 as the scanner. Moreover, when the OS 41 receives the scan job in which the scan server program 44 is designated as the output destination, the OS 41 passes the scan command based on the scan job to the scan server program 44. The scan server program 44 transmits the scan command to the scanner 3 by the dedicated protocol, receives the read result from the scanner 3 and transmits the result to the OS 41. Accordingly, the reading instruction can be executed from the scan application 42 or the like even in the case where the scanner 3 does not conform to the general-purpose protocol, and the read result can be obtained.

Next, a second embodiment embodying the scan system will be explained in detail with reference to the attached drawings. The embodiment discloses the scan system 100 having the same hardware configuration as that of the first embodiment, and in the second embodiment, the scan server program 44 is not shared among a plurality of PCs. That is, PCs using the scanner 3 respectively use scan server programs 44 of the PCs themselves in the scan system 100 according to the embodiment. The same reference signs are given to the same configurations and procedures as those of the first embodiment, and explanation thereof is omitted.

Figure 6:
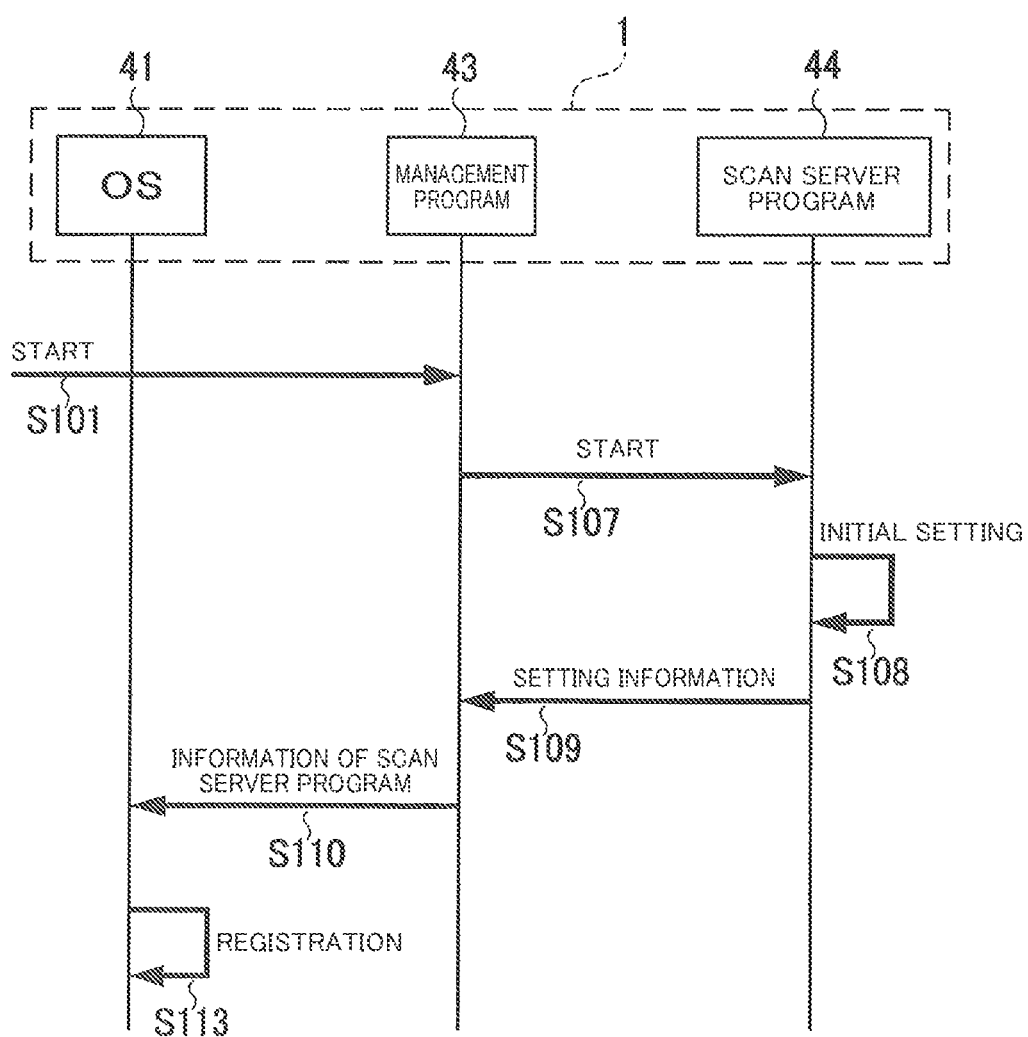
FIG. 6 is a sequence diagram illustrating procedures of startup and registration of a scan server according to a second embodiment.

A procedure of registering a virtual scanner in the scan system 100 according to the embodiment will be explained with reference to a sequence diagram of FIG. 6. When the management program 43 is started (S101), the management program 43 starts the scan server program 44 of the PC 1 without searching for other PCs (S107).

The scan server program 44 executes initial setting (S108), and notifies the management program 43 of setting information of the initial setting (S109). The management program 43 passes information of the scan server program 44 to the OS 41 based on the information received from the scan server program 44 (S110). The OS 41 registers the scan server program 44 as the scanner 3 based on the information received from the management program 43 (S113).

In the embodiment, as described later, the read result received by the scan server program 44 is limited to data addressed to the PC in which the scan server program 44 is running. Accordingly, it is not necessary for the scan server program 44 of the PC 1 to generate the saving destination list, and the scan server program 44 does not receive the list registering request from other PCs. The user desiring to use the scanner 3 in the PC 2 starts the management program 43 in the PC 2 in the same manner as at the PC 1, and starts the scan server program 44 of the PC 2 to be registered in an OS 51 of the PC 2.

A procedure executed when using the scanner 3 at the PC 1 after the procedure of FIG. 6 will be explained. The procedure of so-called pull scan is the same procedure as the procedure explained in the sequence diagram of FIG. 3. That is, the scan server program 44 executes communication with the scanner 3 by the dedicated protocol, confirms the status of the scanner 3 (S204 to S205) and transmits the scan command (S206 to S207). The scanner 3 transmits the read result to the scan server program 44 (S208 to S209). The scan server program 44 receives the read result and passes the read result to the OS 41 of the PC in which the scan server program 44 is running (S211). The scan server program 44 may execute image correction.

Figure 7:
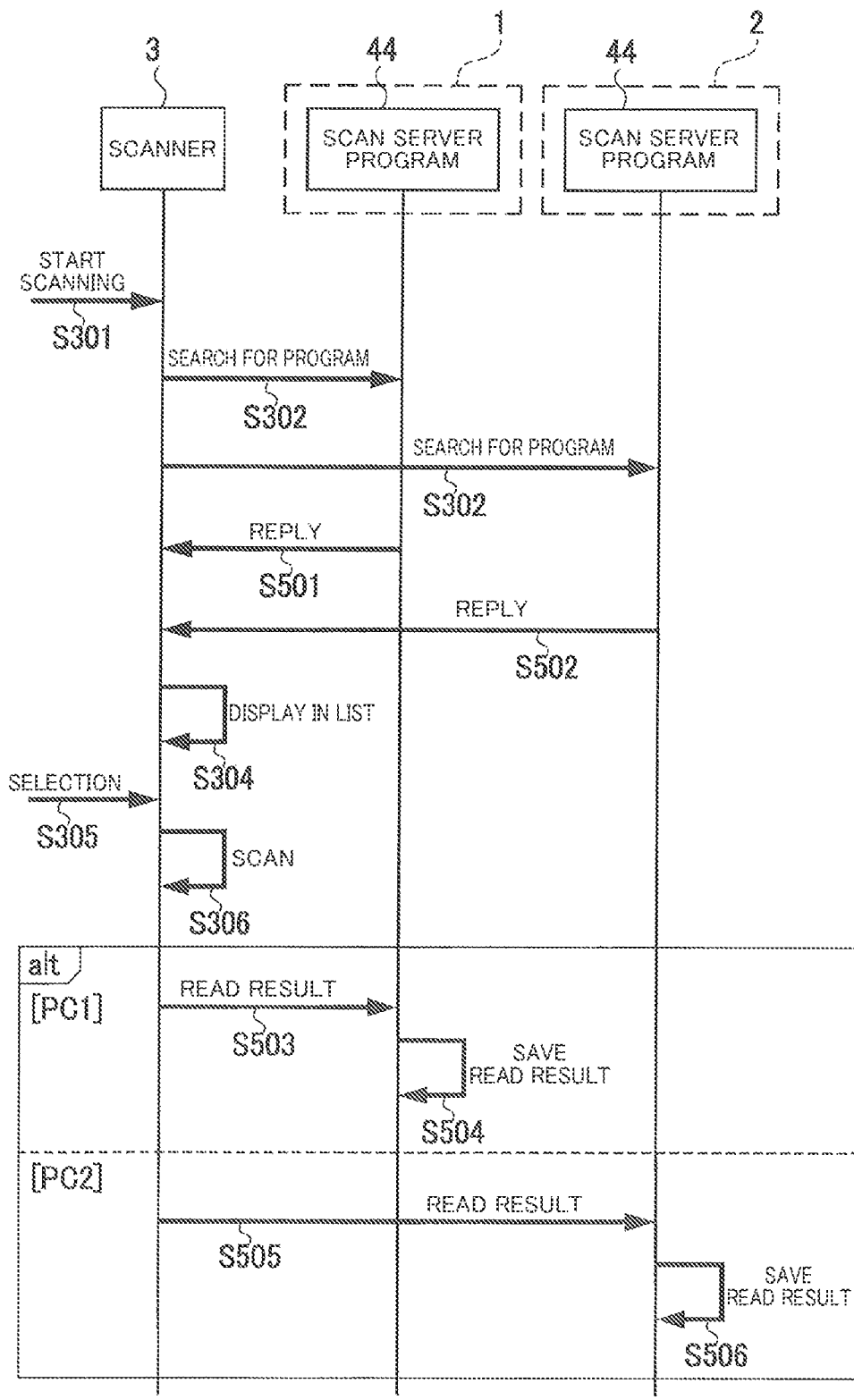
FIG. 7 is a sequence diagram illustrating a procedure of push scan according to the second embodiment.

Next, a procedure of so-called push scan will be explained with reference to a sequence diagram of FIG. 7. FIG. 7 is the sequence diagram in which the procedure of FIG. 6 has been completed at the PC 1 and the PC 2 respectively, and both of the scan server program 44 of the PC 1 and the scan server program 44 of the PC 2 are naming.

The scanner 3 receives the instruction for starting scanning on the operation panel (S301) and transmits the search request to respective PCs of the scan system 100 (S302). The search request at S302 is passed to both of the scan server program 44 of the PC 1 and the scan server program 44 of the PC 2. Respective scan server programs 44 that have received the search request reply to the scanner, respectively. The scan server program 44 of the PC 1 replies to the scanner 3 through the communication IF 14 of the PC 1 (S501). The scan server program 44 of the PC 2 replies to the scanner 3 through the communication IF 24 of the PC 2 (S502).

The scanner 3 displays saving destination information as selectable PCs in a list based on the received replies (S304). The scanner 3 which has received replies from both the scan server program 44 of the PC 1 and the scan server program 44 of the PC 2 displays the PC 1 and the PC 2 to be selectable as saving destination information. The scanner 3 receives a selection by the user from the displayed list (S305), receives the instruction for starting scanning by the user and reads a document image (S306).

When the selection received at S305 is the PC 1 ("PC 1"), the scanner 3 transmits the read result to the scan server program 44 of the PC 1 (S503). The scan server program 44 of the PC 1 saves the received read result in the memory 12 (S504). In the embodiment, the scan server program 44 receives only the read result, the transmission destination of which is the PC 1 in which the scan server program 44 is running. Therefore, it is not necessary for the scanner 3 to transmit the read result to which the saving destination information is added. It is also not necessary for the management program 43 to receive the read result from the scan server program 44.

When the selection received at S305 is the PC 2 ("PC 2"), the scanner 3 transmits the read result to the scan server program 44 of the PC 2 (S505). The scan server program 44 of the PC 2 saves the received read result in the memory 22 (S506). After that, processing of S309 to S311 and S313 illustrated in FIG. 4 may be executed, or processing illustrated in FIG. 5 may be executed.

As explained above in detail, the reading instruction can be made with respect to the scanner 3 that does not conform to the general-purpose protocol from the scan application 42 and the like and the read result can be obtained also in the scan system 100 according to the embodiment. The push scan not supported by the general-purpose scan control program 45 can be realized in a pseudo manner. In the embodiment, communication between the PC 1 and the PC 2 is not necessary and a communication load is small as compared with the first embodiment. On the other hand, the processing load of the PC 1 can be reduced, for example, by using the scan server program 44 of the PC 2 in the first embodiment.

Respective embodiments are merely examples, and do not limit the disclosure at all. Therefore, various modifications and alterations may naturally occur in techniques disclosed in the present specification within a scope not departing from the gist thereof. For example, the numbers of PCs or printers included in respective embodiments are not limited to illustrated examples. For example, the scan system 100 may include two or more scanners and may include a scanner conformable to the general-purpose scan control program 45. Moreover, a PC not having the scan server program 44 may be included.

For example, the scanner 3 transmits the read result to the scan server program 44, and the scan server program 44 stores the read result in the memory area managed by the scan server program 44 itself in the procedure of the push scan; however, the read result may be stored in a memory of the scanner 3. In that case, the scan server program 44 may communicate with the scanner 3 by receiving the request for the read result from the management program 43 or the OS 41 to determine whether the read result exists in the memory of the scanner 3 or not.

For example, the scanner 3 may receive registration of the saving destination list by the scanner 3 itself to be stored in advance instead of receiving the saying destination list from the scan server program 44. For example, the registration of the saving destination list may be received by a direct input to the scanner 3 using the operation panel or the like of the scanner 3 or may be stored by receiving the saving destination list from the scan application 42 or the like. On the other hand, it is not necessary to store the list in the scanner 3 in advance in the configuration in which the scanner 3 receives the saving destination list from the scan server program 44.

For example, it is not always necessary for the scan server program 44 to execute correction processing. There may be another program executing correction processing.

The management program 43 may be contained in the scan server program 44 in the case of the second embodiment. That is, the scan server program 44 may have a function of registering the program itself in the OS 41 when the program is started.

In arbitrary flowcharts disclosed in respective embodiments, a plurality of processing in a plurality of arbitrary steps may be arbitrarily changed in the execution order or may be executed in parallel in a range not causing discrepancy in the processing contents.

The processing disclosed in the embodiments may be executed by a single CPU, a plurality of CPUs, hardware such as ASIC or combinations of them. The processing disclosed in the embodiments may be realized in various states such as a recording medium recording programs or methods for executing the processing.

What is claimed is:

1. A non-transitory storage medium storing a program set readable by a computer of a first information processing apparatus, the program set including a first program and a second program,
    wherein, in a state in which (i) an external scanner conforming to a first protocol is communicable through a communication interface of the first information processing apparatus and (ii) the second program corresponding, to the external scanner is not started, the first program, when executed by the computer, causes the first information processing apparatus to:
        start the second program, and
        register the started second program, as a virtual scanner, in an operating system of the first information processing apparatus, and
    wherein, when the operating system receives, by a second protocol different from the first protocol, a scan job in which the second program registered as the virtual scanner in the operating system is designated as an output destination, the second program, when executed by the computer, causes the first information processing apparatus to:
   transmit a scan command of the first protocol to the external scanner through the communication interface based on the received scan job, the external scanner being conformable to the first protocol, and
   receive a read result from the external scanner by the first protocol through the communication interface, the external scanner reading a document in response to receipt of the scan command transmitted from the information processing apparatus.

2. The not storage medium according to claim 1,
wherein, when executed by the computer, the second program causes the first information processing apparatus to:
when the information processing apparatus receives the read result from the external scanner through the communication interface before transmitting the scan command to the external scanner, store the received read result into a memory area managed by the second program.

3. The non-transitory storage medium according to claim 2,
wherein, when the operating system receives, by the second protocol, the scan job in which the second program is designated as the output destination, the second program, when executed by the computer, cause the first information processing apparatus to:
   when the read result is not stored in the memory area, transmit the scan command of the first protocol to the external scanner through the communication interface based on the received scan job, and
   when the read result is stored in the memory area, output the read result stored in the memory area to the operating system without transmitting the scan command to the external scanner through the communication interface.

4. The non-transitory storage medium according to claim 2,
wherein, when executed by the computer, the second program causes the first information processing apparatus to output the read result stored in the memory area from the second program to the first program based on an output request of the read result from the first program to the second program, and
wherein, when executed by the computer, the first program causes the first information processing to save the read result outputted from the second program to the first program as a file.

5. The non-transitory storage medium according to claim 1,
wherein a second information processing apparatus is connected to the first information processing apparatus,
wherein the second program is incorporated in each of the first information processing apparatus and the second information processing apparatus, and
wherein, when executed by the computer, the first program causes the first information processing apparatus:
   not to start the second program of the first information processing apparatus when the second program of the second information processing apparatus is started, and
   to register the second program of the second information processing apparatus in the operating system as the virtual scanner when (i) the second program of the first information processing apparatus is not started while the second program of the second information processing apparatus is started and (ii) the second program of the second information processing apparatus is not registered in the operating system of the first information processing apparatus as the virtual scanner.

6. The non-transitory storage medium according to claim 5,
wherein, when executed by the computer, the second program causes the first information processing apparatus to:
   when a search request from the external scanner is received, transmit apparatus identification information for identifying the first information processing apparatus to the external scanner, the external scanner being capable of storing a plurality of pieces of saving destination information indicating saving destinations of the read result, the saving destination of the read result being selectable from the plurality of pieces of saving destination information;
   after the external scanner receives the apparatus identification information for identifying the first information processing apparatus, transmit, to the first information processing apparatus, the read result associated with the selected saving destination information when the first information processing apparatus is selected as the saving destination, and,
   when the first information processing apparatus receives the read result transmitted from the external scanner by the first protocol through the communication interface, store the received read result associated with the saving destination information into the memory area managed by the second program.

7. The non-transitory storage medium according to claim 1,
wherein a second information processing apparatus is connected to the first information processing apparatus,
wherein the second program is incorporated in each of the first information processing apparatus and the second information processing apparatus,
wherein, when executed by the computer, the first program causes the first information processing apparatus to:
   in a case where the second program of the first information processing apparatus is started, output a list registration request from the first program to the second program of the first information processing apparatus, and
   in a case where (i) the second program of the first information processing apparatus is not started while the second program of the second information processing apparatus is started and (ii) the second program of the second information processing apparatus is not registered in the operating system of the first information processing apparatus, transmit the list registration request to the second program of the second information processing apparatus, and
wherein, when executed by the computer, the second program causes the first information processing apparatus to:
   register apparatus identification information for identifying the second information processing apparatus as a transmission destination of the list registration request in a list of the second program, and
   transmit, to the external scanner, the apparatus identification information registered in the list of the second program when the first processing apparatus receives the search request from the external scanner.

8. The non-transitory storage medium according to claim 1,
wherein a second information processing apparatus is connected to the first information processing apparatus,
wherein the second program is incorporated in each of the first information processing apparatus and the second information processing apparatus, and
wherein, in a case where an operating system of the second information apparatus receives the scan job in which the second program is designated as an output destination by the second protocol, the second program, when executed by the computer, causes the first information processing apparatus to:
when the read result associated with apparatus identification information for identifying the second information processing apparatus is not stored in a memory area managed by the second program, transmit, to the external scanner, a scan command of the first protocol to which the external scanner is conformable through the communication interface based on the received scan job, and
when the read result associated with the apparatus identification information for identifying the second information processing apparatus is stored in the memory area managed by the second program, transmit, to the operating system of the second information processing apparatus, the read result associated with the apparatus identification information for identifying the second information processing apparatus stored in the memory area without transmitting the scan command to the external scanner through the communication interface.

9. The non-transitory storage medium according to claim 1,
wherein a second information processing apparatus is connected to the first information processing apparatus,
wherein the second program is incorporated in each of the first information processing apparatus and the second information processing apparatus, and
wherein, when executed by the computer, the first program causes the first information processing apparatus to:
transmit an output request for the read result to the second program of the second information processing apparatus,
receive the read result, transmitted as a response to the output request, from the second information processing apparatus, the read result being associated with saving destination information indicating the first information processing apparatus that has been transmitted with the output request for the read result stored in a memory area managed by the second program of the second information processing apparatus, and
store the received read result as a file.

10. The non-transitory storage medium according to claim 1,
wherein, when executed by the computer, the second program causes the first information processing apparatus to correct an image of the read result received from the external scanner through the communication interface.

11. A method for obtaining a read result causing an information processing apparatus to obtain the read result of an external scanner conforming to a first protocol, in a case where (i) the external scanner is communicable with the information processing apparatus and (ii) a scan server program conforming to the external scanner is not started in the information processing apparatus, causing the information processing apparatus to:
start the scan server program in the information processing apparatus,
register the started scan server program in an operating system of the information processing apparatus as a virtual scanner,
when the operating system receives, by a second protocol different from the first protocol, a scan job in which the scan server program registered as the virtual server in the operating system is designated as an output destination in a state in which the scan server program is started, obtain the scan job by the scan server program,
transmit a scan command of the first protocol to the external scanner based on the obtained scan job, the external scanner being conformable to the first protocol, and
receive a read result obtained from the external scanner by the first protocol, the external scanner reading a document in response to receipt of the scan command transmitted from the information processing apparatus.

12. An information processing apparatus, comprising:
a communication interface; and
a computer,
wherein the computer is configured to:
in a case where (i) an external scanner conforming to a first protocol is communicable with the information processing apparatus through the communication interface and (ii) a scan server program conforming to the external scanner is not started in the information processing apparatus, start the scan server program,
register the started scan server program in an operating system of the information processing apparatus as a virtual scanner,
when the operating system receives, by a second protocol different from the first protocol, a scan job in which the scan server program registered as the virtual scanner in the operating system is designated as an output destination in a state in which the scan server program is started, cause the scan server program to obtain the scan job,
transmit a scan command of the first protocol to the external scanner through the communication interface based on the obtained scan job, the external scanner being conformable to the first protocol, and
receive a read result obtained from the external scanner by the first protocol through the communication interface, the external scanner reading a document in response to receipt of the scan command transmitted from the information processing apparatus.

* * * * *

UNITED STATES PATENT AND TRADEMARK OFFICE
CERTIFICATE OF CORRECTION

PATENT NO. : 11,283,940 B2
APPLICATION NO. : 17/194496
DATED : March 22, 2022
INVENTOR(S) : Ryoichi Sato It is certified that error appears in the above-identified patent and that said Letters Patent is hereby corrected as shown below:

In the Claims

<u>Claim 2, Column 15, Line 13:</u>
Please change: "The not storage medium according to claim 1," to -- The non-transitory storage medium according to claim 1, --

Signed and Sealed this
Sixth Day of June, 2023

Katherine Kelly Vidal
*Director of the United States Patent and Trademark Office*